US008667542B1

(12) United States Patent
Bertz et al.

(10) Patent No.: US 8,667,542 B1
(45) Date of Patent: Mar. 4, 2014

(54) SYSTEM AND METHOD OF FILTERED PRESENTATION OF BROADCAST MESSAGES BY MOBILE DEVICES

(75) Inventors: Lyle T. Bertz, Lee's Summit, MO (US); Jason R. Delker, Olathe, KS (US); John M. Everson, Leawood, KS (US); Frederick C. Rogers, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1061 days.

(21) Appl. No.: 12/348,720

(22) Filed: Jan. 5, 2009

(51) Int. Cl.
*H04N 7/16* (2011.01)

(52) U.S. Cl.
USPC .................. 725/62; 725/32; 725/33; 725/34; 725/35

(58) Field of Classification Search
USPC .................................. 725/32–35, 62; 348/116
See application file for complete search history.

(56) References Cited

U.S. PATENT DOCUMENTS

| | | | |
|---|---|---|---|
| 7,114,170 B2 * | 9/2006 | Harris et al. ..................... | 725/34 |
| 2003/0065805 A1 * | 4/2003 | Barnes, Jr. .................... | 709/231 |
| 2003/0208754 A1 * | 11/2003 | Sridhar et al. .................. | 725/34 |
| 2004/0078809 A1 * | 4/2004 | Drazin ............................. | 725/34 |
| 2007/0136761 A1 * | 6/2007 | Basmajian et al. ............. | 725/62 |
| 2007/0294722 A1 * | 12/2007 | Kang et al. ...................... | 725/34 |
| 2008/0004957 A1 * | 1/2008 | Hildreth et al. ................ | 705/14 |
| 2008/0133336 A1 * | 6/2008 | Altman et al. .................. | 705/10 |
| 2008/0140529 A1 * | 6/2008 | Agarwal et al. ................ | 705/14 |
| 2009/0018913 A1 * | 1/2009 | Sarukkai et al. ............... | 705/14 |
| 2009/0198580 A1 * | 8/2009 | Broberg et al. ................ | 705/14 |
| 2010/0088719 A1 * | 4/2010 | Hawkins et al. ............... | 725/34 |

OTHER PUBLICATIONS

Williams, Martyn, "Samsung, LG to Push Single Mobile Digital Format in US", IDG News Service, PC World, May 14, 2008, http://www.pcworld.com/printable/article/id,145852/printable.html. PC World Communications, Inc.

* cited by examiner

*Primary Examiner* — Pankaj Kumar
*Assistant Examiner* — Timothy Newlin

(57) ABSTRACT

A mobile electronic device is provided. The mobile electronic device comprises a radio receiver, an application that selects a message, and an output device to present the message. The radio receiver receives the message broadcast in a television spectrum band. The application, when executed on the mobile electronic device, selects the message for presentation on the mobile electronic device based on at least one of a location of the mobile electronic, a history based user profile associated with the mobile electronic device, and a selection criteria input into the mobile electronic device. The output device then presents the message.

18 Claims, 5 Drawing Sheets

SYSTEM AND METHOD OF FILTERED PRESENTATION OF BROADCAST MESSAGES BY MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Federal Communications Commission (FCC) assigns specific bandwidths to radio and television stations that they can use for their broadcast. Some of these broadcasts may use advanced vestigial sideband (AVSB).

Consumers today carry some form of a mobile electronic device (e.g., cell phone, wireless computer, personal digital assistant, portable navigation system, personal digital television) which has a transceiver that communicates bi-directionally with a radio access network. As technology progresses, more of these mobile electronic devices now contain some form of a screen to display content to the user.

SUMMARY

In an embodiment, a mobile electronic device is provided. The mobile electronic device comprises a radio receiver, an application that selects a message, and an output device to present the message. The radio receiver receives the message broadcast in a television spectrum band. The application, when executed on the mobile electronic device, selects the message for presentation on the mobile electronic device based on at least one of a location of the mobile electronic device, a history based user profile associated with the mobile electronic device, and a selection criteria input into the mobile electronic device. The output device then presents the message.

In another embodiment, a mobile electronic device is provided. The device comprises a radio receiver, a radio transceiver, and an application to select messages. The radio receiver receives messages broadcast uni-directionally in a high definition television channel. The radio transceiver communicates bi-directionally with a radio access network. The application, when executed by the mobile electronic device, selects at least one of the messages for presentation on the mobile electronic device based on at least a selection criteria received via the radio transceiver.

In another embodiment, a method of content distribution is provided. The method comprises receiving messages, selecting messages, presenting messages, and sending a report about the selected messages. The plurality of received messages are wirelessly broadcast uni-directionally in a television channel. The method then selects one of the content messages based on at least one of a location of a mobile electronic device, a history based user profile associated with the mobile electronic device, and a selection criteria input into the mobile electronic device. The method then presents the selected content message on a mobile electronic device and sends a report about presenting the selected content message to a wireless communication service provider computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descriptions, taken in connection with the accompanying drawings and detailed description, wherein like reference numerals represent like parts.

DETAILED DESCRIPTION

Figure 1:
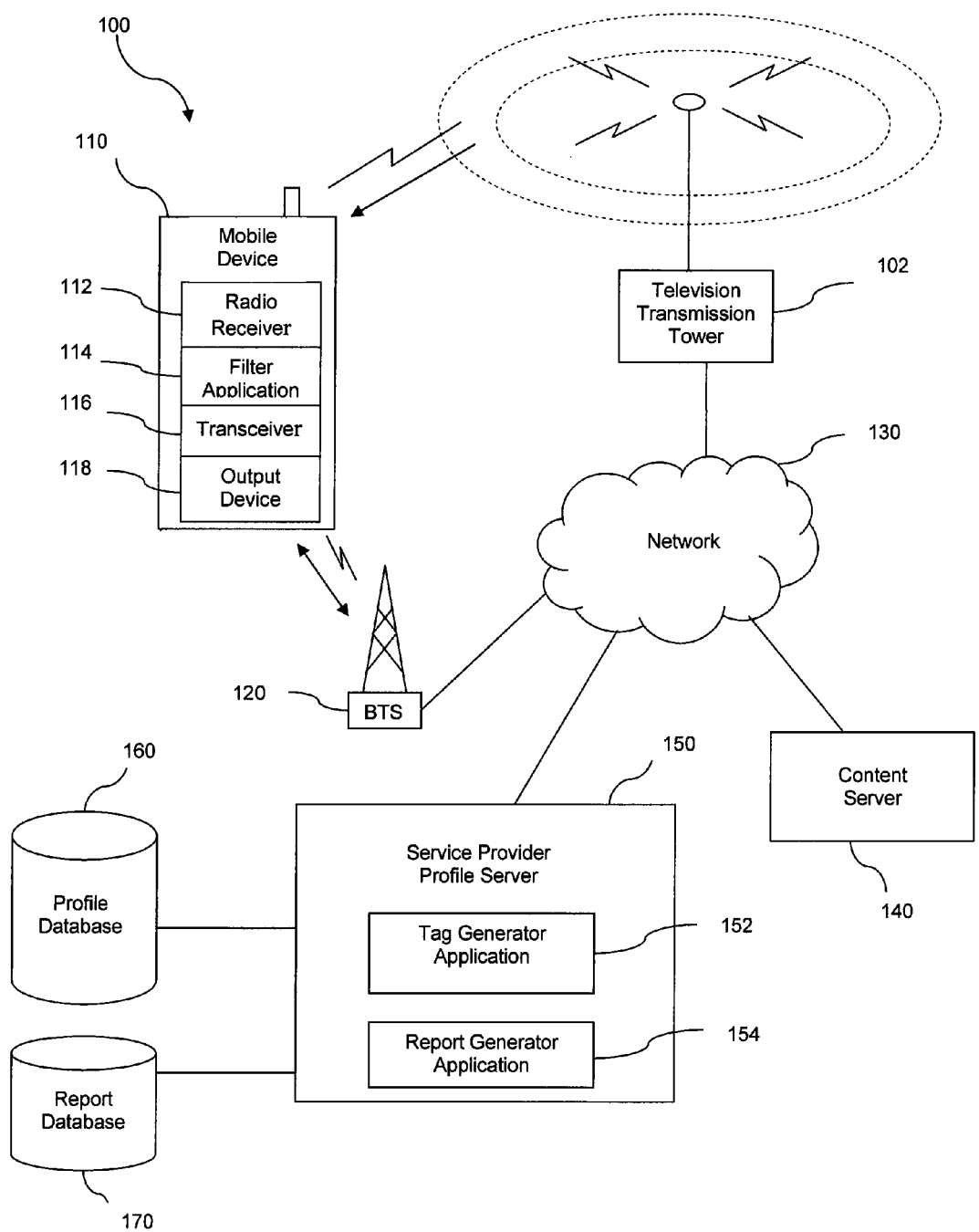
FIG. 1 illustrates a broadcast system according to an embodiment of this disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method of using a mobile device to selectively present broadcast messages is disclosed. In some contexts, the mobile device may be referred to as a mobile electronic device. In an embodiment, a content server receives information from advertising agencies and then transmits the information as messages to a television broadcasting company. Alternatively, the content server may also receive public service information and then transmit the public service information as messages to the television station. The messages may comprise advertising content, public service information, and other types of information. In addition to content, the messages may comprise metadata and/or header information that identify one or more selection criteria. The television company uni-directionally broadcasts the messages in an unused portion of a television spectrum band, for example in an unused portion of a digital television spectrum band and/or a high definition television spectrum band. In another embodiment, a transmitter unassociated with the television company, for example a transmitter owned by a communication service provider or other company, may be used to broadcast the messages. Additionally, in another embodiment, a spectrum band other than the television spectrum band may be used for broadcasting the messages. In an embodiment, the mobile device (e.g., cell phone, wireless computer, personal digital assistant, portable navigation system, personal digital television) is comprised of a radio receiver that receives the messages in a television channel, a radio transceiver that communicates bi-directionally with a wireless service provider to obtain the user's profile information, a filter application that selects messages based on the user's profile, and an output device that displays the selected messages to the user. In some embodiments, the filter application may select messages for display without relying upon the user profile information, for example the filter application may select a message for presentation based on a location criteria carried in metadata in the message and based on the current location of the mobile device and/or criteria that may be entered explicitly by a user of the mobile device. The messages may be stored on the mobile device and re-evaluated by the selection application at a later time, for example at a time when the mobile device may have moved to a different location such that a location criteria in the message metadata is satisfied by the current location of the mobile device and hence trigger the presentation of one of the stored messages. In an embodiment, stored messages may be deleted after a pre-defined period of time.

In an embodiment, the selection may be based on the geographic location of the mobile device; based on the age, gender, language, socioeconomic, and/or previous buying habits of the user; based on a tag placed on the mobile device, for example a tag placed on the mobile device by a service provider; and based on an input provided by a user of the mobile device. In an example of using selection based on location, if the message comprises an offer for a free meal at a local restaurant for users attending a local football game, the filter application may select the message for presentation on the mobile device if the location of the mobile device, determined by the global positioning system (GPS) coordinates of the mobile device, is proximate to the global positioning system coordinates provided in metadata contained in the message, for example within a quarter mile radius of the global positioning system coordinates provided by the metadata. In addition, the mobile device may store the message in a memory cache for a pre-defined period of time, and the filter application may re-evaluate the message at a later time to determine if the message should be displayed then (e.g., if the user is not inside the football stadium when the message is originally broadcast but arrives an hour later, the message may be presented at that time). Another example of selecting broadcast messages for presentation may be a message containing an advertisement for an expensive automobile. The filter application may select users based on buying habits or socioeconomic status so that the message only displays to customers who previously bought or researched expensive cars, whose income level would permit the purchase of the car, and/or who live within a reasonable proximity of the dealership. Broadcast messages could also be used to send out public service announcements (e.g., severe weather warnings, Amber alerts), and the filter application can select public service announcements for presentation based, for example, on location of the mobile device.

In another implementation of filtering messages on a mobile device, a user can manually indicate a specific need (e.g., food, lodging, real estate). The mobile device may contain a memory that retains previous messages which can be used to allow the mobile device to respond to a request and display the locations of the desired product within a defined proximity of the user. For example, if the user is hungry and wants to find an Italian restaurant, the user may access an interface screen of the mobile device and enter textual information indicating his current interest in locating an Italian restaurant. In response to the user's manually entered criteria, the filter application may re-evaluate a previously stored message containing an advertisement for an Italian restaurant and select this message for display and/or presentation. Alternatively, the filter application may identify a new incoming message containing an advertisement for an Italian restaurant and select this message for display and/or presentation In an embodiment, the mobile device may send messages to a service provider identifying broadcast messages that have been selected for presentation on the mobile device. The service provider, for example a server computer in a service provider network, may accumulate this feedback from a plurality of subscribers and generate statistical digests of this information. The service provider may use this feedback to bill advertisers or others for delivering the broadcast message to a subscriber that matched a criteria provided in the metadata of the broadcast message. The service provider may sell the statistical digests of the information to advertisers or others interested in this information.

By contrast with advertising systems or methods that target a specific ad for uni-casting to a particular mobile device, the present disclosure teaches broadcasting a specific ad to all mobile devices in a coverage area, a coverage area that may be relatively large (e.g., a metropolitan area), and delegating selection and/or activation to present the ad to a filtering application executing on the mobile device. The present disclosure supports some different advertising scenarios that may provide more flexibility and more dynamic interactions with potential customers. For example, a low income individual who is given free tickets to attend a professional sporting event may not be associated with a profile of an individual who attends professional sporting events and therefore is not a preferred target for receiving an advertisement to eat pizza at a restaurant proximate the stadium after the game. The present disclosure teaches a system, for example, that broadcasts the advertisement to eat pizza at the restaurant proximate the stadium after the game to all mobile devices within a coverage area and delegating activation to present the ad on those mobile devices located proximate to the stadium at about the time the game is taking place, which would include the low income individual who, contrary to their profile, is attending the game.

As another example, a husband and wife who have never eaten ethnic food in the past because they live in a rural area that lacks ethnic restaurants may not be targeted to receive uni-cast targeted advertisements for an ethnic restaurant. The present disclosure, however, teaches broadcasting an advertisement for an ethnic restaurant to all mobile devices within a coverage area and delegating activation to present the ad on those mobile devices, for example, that may indicate an interest in dining on the particular variety of ethnic food. The husband and wife, while visiting a large city, may indicate on an mobile device that they would like to eat a specific variety of ethnic food, and the mobile device, which has received the broadcast advertisement, will respond to the entry of this information by selecting the advertisement of the particular ethnic restaurant for presentation on the mobile device.

In the above scenarios, a uni-cast targeted advertising system may not be agile enough to adopt the profiles quickly enough to send the appropriate advertisement to the example individuals. Additionally, the uni-cast targeted advertising system might overload these individuals with in appropriate advertisements. The present disclosure further teaches some embodiments returning feedback about the activated and/or presented broadcast advertisements back to the advertisers using non-broadcast communication channels. This feedback may provide valuable marketing information to advertisers.

Turning now to FIG. 1, a system 100 for filtering messages broadcast to mobile devices is disclosed. The system 100 comprises a mobile device 110, a television transmission tower 102, a base transceiver station 120, a network 130, a content server 140, a service provider profile server 150, a profile database 160, and a report database 170. The mobile device 110 is comprised of a radio receiver 112, a filter application 114, a transceiver 116, and an output device 118 and may be implemented as a mobile phone, wireless computer, personal digital assistant, portable navigation system, personal digital television, or any other mobile device having wireless communication capability. A mobile phone is discussed in detail hereinafter. The service provider profile server 150 is comprised of a tag generator application 152 and a report generator application 154 and may be implemented as a general purpose computer which is discussed in detail hereinafter.

In an embodiment of the system 100, the content server 140 may contain information from advertising agencies that want to send messages (e.g., advertisements, electronic coupons) to consumers. The messages may contain selection criteria that specify what type of consumer should receive a message. The messages are transmitted through the network 130 to the television transmission tower 102 which then broadcasts the messages uni-directionally in an unused portion of a television channel, for example in a high definition television channel and/or a digital television channel to the mobile device 110 in a reception area. In another embodiment, the messages may be transmitted through the network 130 to a different transmitter for broadcasting, for example to a transmitter operated by a communication service provider or other transmission facilities operator. Additionally, the messages may be broadcast using different spectrum other than television spectrum. In an embodiment, the messages may be broadcast serially in a single spectrum and/or channel. In another embodiment, however, the messages may be broadcast in parallel on two or more spectrums and/or channels concurrently.

In an embodiment, a reception area may comprise an approximate circular region centered on the television transmission tower with about a 45 mile radius. Those skilled in the art will appreciate that a variety of radio propagation conditions may affect the reception area in different cases and may cause the geometric shape of the reception area to diverge from an ideal circular shape and the radius of the coverage area to vary from the exemplary 45 miles indicated above.

The radio receiver 112 receives the messages broadcast from the television transmission tower 102 in a television spectrum band. The transceiver 116 communicates bi-directionally through the base transceiver station 120 and the network 130 to the service provider profile server 150 to access user profile information stored in the profile database 160. In some contexts, the base transceiver station 120 may be said to provide, in combination with other base transceiver stations 120 (not shown) and in combination with other electronic equipment well known to those skilled in the art, a radio access network and/or a public land mobile network. The network 130 may comprise any combination of public networks and/or private networks. The network 130 may comprise any combination of wireless communication networks and/or wired networks, for example a combination of public land mobile networks (PLMNs), public switched telephone networks (PSTNs), and public data networks (PDNs). In an embodiment, the radio receiver 112 and the transceiver 116 operate in different radio frequency bands.

The filter application 114 may compare the selection criteria specified in the message, for example in a metadata portion or a header portion of the message, to the geographic location of the mobile device 110 and/or the user information stored in the profile database 160. If the mobile device 110 is in a specified location (e.g., within the global positioning system coordinates of a football field) or if the user's profile matches other selection criteria (e.g., age, gender, language, socioeconomic status, buying habits) the filter application 114 selects the message. The output device 118 displays the selected message to the user in the form of a video, a text, or an audio. The mobile device 110 may also store multiple messages for future re-evaluation and then delete them after a predefined period of time.

The service provider profile server 150 may gather information from the user of the mobile device 110 by recording the user's address, demographic information, and past history of purchases or electronic research. The profile information for the user is stored in the profile database 160 to use for future message selection criteria and/or for other purposes. In some embodiments, the service provider can also use the tag generator application 152 which analyzes the user profile and may drop tags on the user's mobile device 110, which can trigger selection of a message for presentation on the output device 118, for example an advertisement or coupon. The report generator application 154 may record the messages selected by the filter application 114 to generate reports which are stored in the report database 170. In an embodiment, the service provider profile server 150 can use the report data to bill the advertising agencies for selected messages or may sell a digest of the reports to advertising agencies who want to target consumers based on existing information.

Figure 2:
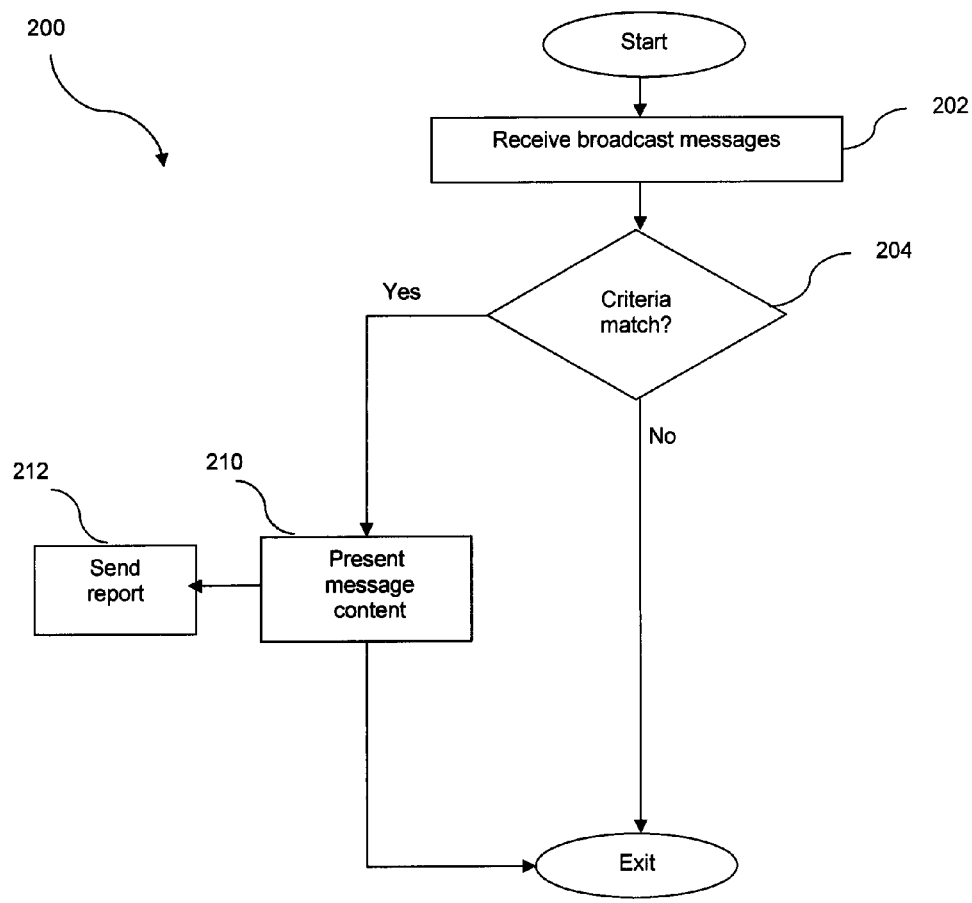
FIG. 2 is a flow chart of a method of content distribution according to an embodiment of this disclosure.

Turning now to FIG. 2, a method 200 for filtering content to mobile electronic devices is described. The method 200 begins at block 202 where the mobile device 110 receives multiple messages (e.g., advertisements, coupons, public service messages) broadcast from the television transmission tower 102 in an unused portion of a high definition television spectrum. The messages may be comprised of metadata that indicates the type of consumer that should receive the message. Moving to block 204, the filter application 114 in the mobile device 110 compares the metadata content of the messages to the profile database 160 to determine which messages to select for the user. If the selection criteria for a message (e.g., location, demographic, product) matches the user profile, the method 200 moves to block 210 and presents the message to the user on the output device 118. Optionally, once a message is presented on the mobile device, block 212 may be activated which sends a report to the service provider profile server 150 to store the selection information in the report database 170. The report may include the identification of the selected message, the time the message was presented to the user, the location of the mobile device when the message was presented, and an identification of the user profile characteristic that caused the message to be selected. The wireless communication service provider may use the reports generated in block 212 to calculate a charge to bill the advertising company for each time a message is presented to a user. Alternatively, the service provider may analyze the accumulated information to generate a statistical digest which can be sold to others (e.g., advertisers that want to concentrate their marketing efforts on specific demographics).

If in block 204, the selection criteria for the message does not match that of the user profile, no message is selected. A message can be stored in the filter application 114 for a pre-defined amount of time and periodically re-evaluated in the event that the selection criteria may apply to the mobile device at a later time. For example, if the selection criteria is a location that contains specific global positioning system (GPS) coordinates or cell sector information (e.g., inside a baseball stadium), the user may not be inside the stadium when the message is first sent, but may arrive an hour later. Once a message is received, method 200 may continuously repeat the cycle of filtering and presenting the message until it is deleted after a pre-determined duration of time.

Figure 3:
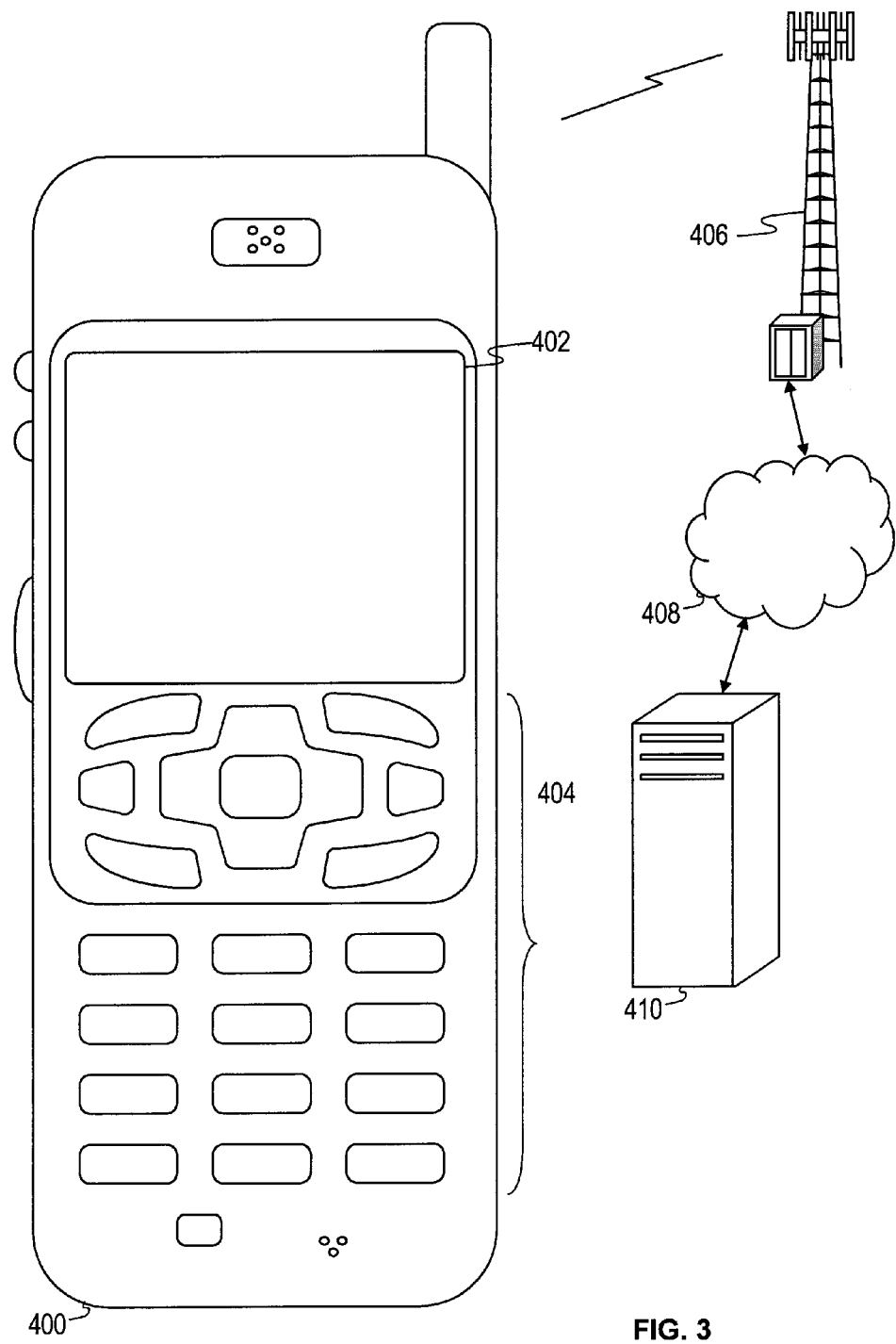
FIG. 3 illustrates a handset suitable for implementing an embodiment of the disclosure.

FIG. 3 illustrates a wireless communications system including the mobile device 400, which may be similar to the type of mobile electronic device illustrated in FIG. 1. FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the Internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 4:
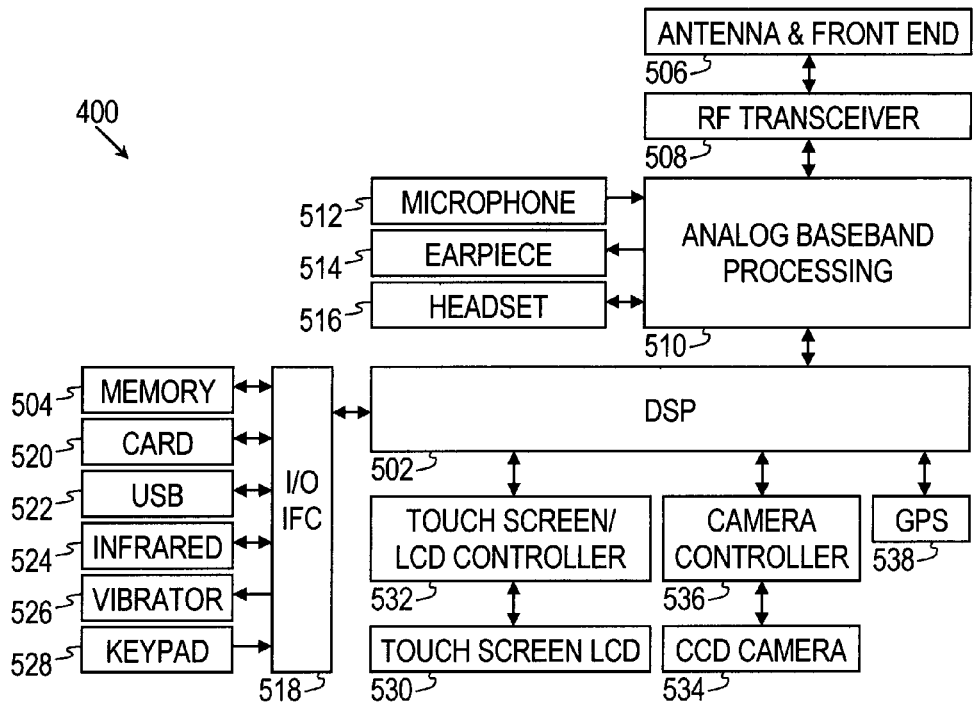
FIG. 4 is a block diagram of a handset suitable for implementing an embodiment of the disclosure.

FIG. 4 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 5:
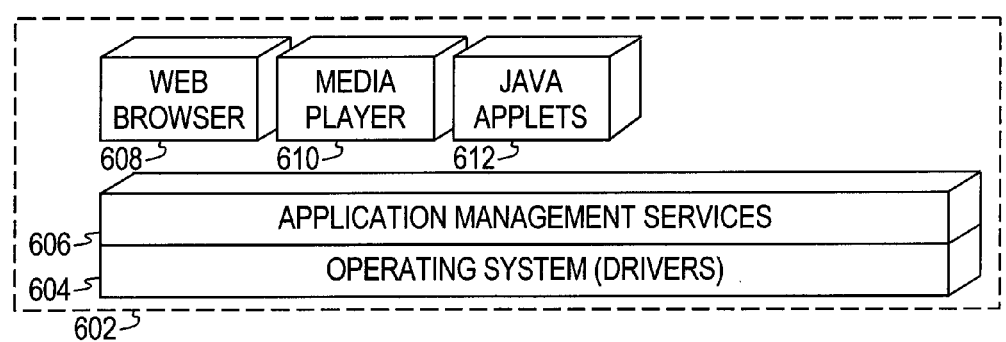
FIG. 5 is a block diagram of a software architecture of a handset suitable for implementing an embodiment of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 5 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 6:
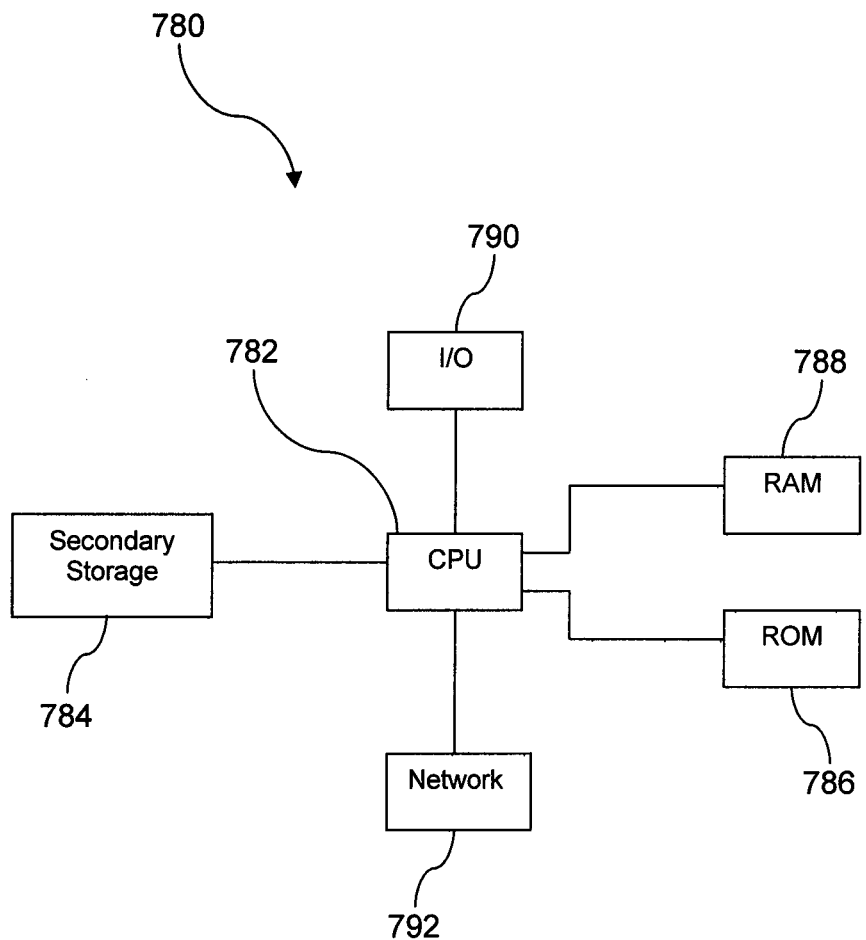
FIG. 6 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (COMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 382, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in wavegu ides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile electronic device, comprising:
   a radio receiver to receive a plurality of messages broadcast in a television spectrum band, wherein each of the plurality of messages comprises content and a plurality of selection criteria, wherein the plurality of selection criteria comprises a plurality of age, gender, language, socioeconomic status, and buying habits;
   an application that, when executed on the mobile electronic device,
      selects at least one message from the plurality of messages broadcast in the television spectrum band for presentation on the mobile electronic device based on the corresponding plurality of selection criteria included in the at least one message, and at least one of a location of the mobile electronic device, a history based user profile associated with the mobile electronic device, and a selection criteria input into the mobile electronic device;
      stores at least some of the plurality of messages broadcast in the television spectrum band on the mobile electronic device for a predetermined time duration in response to a determination that the plurality of selection criteria do not apply to the at least some of the plurality of messages,
      re-evaluates the at least some of the plurality of messages against the plurality of selection criteria within the predetermined time duration,
      in response to the re-evaluation resulting in the plurality of selection criteria applying to one of the at least some of the plurality of messages, presents the one of the at least some messages, and
      in response to the reevaluation resulting in the plurality of selection criteria not applying to any of the at least some of the plurality of messages and the predetermined time duration lapsing, deletes the at least some of the plurality of messages; and
   an output device to present the content in the at least one message.

2. The mobile electronic device of claim 1, wherein the at least one message is broadcast in a mobile digital television spectrum band.

3. The mobile electronic device of claim 1, further including a radio transceiver to communicate bi-directionally with a radio access network, wherein the mobile electronic device receives history based user profile information via the radio transceiver, wherein the application selects the at least one message for presentation based on the information.

4. The mobile electronic device of claim 1, wherein the mobile electronic device is one of a mobile phone, a personal digital assistant, a laptop computer, a tablet computer, a portable navigation system, and a personal digital television.

5. A mobile electronic device, comprising:
   a radio receiver to receive messages broadcast uni-directionally in a high definition television channel, wherein each of the messages comprises content and a plurality of selection criteria, wherein the plurality of selection criteria comprises a plurality of age, gender, language, socioeconomic status, and buying habits;
   a radio transceiver to communicate bi-directionally with a radio access network and to receive each of the messages comprising the plurality of selection criteria broadcast uni-directionally in the high definition television channel, and
   an application that, when executed by the mobile electronic device,
      selects at least one of the messages broadcast uni-directionally in the high definition television channel for presentation on the mobile electronic device based on at least the corresponding plurality of selection criteria included in the at least one message received via the radio transceiver and a user profile associated with the mobile electronic device, wherein the corresponding plurality of selection criteria are determined by an application server in a wireless communication service provider network, and wherein the user profile comprises at least one of demographic information or past history of purchases;
      stores at least some of the messages broadcast uni-directionally in a high definition television channel on the mobile electronic device for a predetermined time duration in response to a determination that the plurality of selection criteria do not apply to the at least some of the messages, re-evaluates the at least some of the messages against the plurality of selection criteria within the predetermined time duration, in response to the re-evaluation resulting in the plurality of selection criteria applying to one of the at least some of the messages, presents the one of the at least some messages, and in response to the reevaluation resulting in the plurality of selection criteria not applying to any of the at least some of the messages and the predetermined time duration lapsing, deletes the at least some of the messages.

6. The mobile electronic device of claim 5, wherein the messages are broadcast in an unused portion of the high definition television channel.

7. The mobile electronic device of claim 5, wherein the user profile is built based on a history of messages received from the mobile electronic device by the wireless communication service provider network.

8. The mobile electronic device of claim 5, wherein the content in the at least one message comprises an advertisement.

9. The mobile electronic device of claim 8, wherein the content in the least one message further comprises an electronic coupon.

10. The mobile electronic device of claim 5, wherein the application further selects at least one of the messages for presentation based on a location of the mobile electronic device, wherein the mobile electronic device determines its own location based on at least one of global positioning system information and cell sector information.

11. A method of content distribution, comprising:

receiving, by a first mobile device and a second mobile device, a plurality of content messages, wherein the content messages are wirelessly broadcast uni-directionally in a television channel, and wherein each of the content messages comprise content and a plurality of selection criteria, wherein the plurality of selection criteria comprises a plurality of age, gender, language, socioeconomic status, and buying habits;

selecting, by the first mobile device, a first content message of the content messages wirelessly broadcast uni-directionally in the television channel based on the plurality of selection criteria in the first content message and at least one of a location of a first mobile electronic device, a history based user profile associated with the first mobile electronic device, and a selection criteria input into the first mobile electronic device;

selecting, by the second mobile device, a second content message of the content messages wirelessly broadcast uni-directionally in the television channel based on the plurality of selection criteria in the second content message and at least one of a location of a second mobile electronic device, a history based user profile associated with the second mobile electronic device, and a selection criteria input into the second mobile electronic device;

presenting, by the first mobile device, the content in the first content message on the first mobile electronic device;

presenting, by the second mobile device, the content in the second content message on the second mobile electronic device;

storing, by the first mobile device, at least some of the plurality of content messages wirelessly broadcast uni-directionally in the television channel for a predetermined time duration in response to a determination that the plurality of selection criteria do not apply to the at least some of the plurality of content messages, re-evaluating, by the first mobile device, the at least some of the plurality of content messages against the plurality of selection criteria within the predetermined time duration;

in response to the re-evaluation resulting in the plurality of selection criteria applying to one of the at least some of the plurality of content messages, presenting, by the first mobile device, the one of the at least some messages, in response to the reevaluation resulting in the plurality of selection criteria not applying to any of the at least some of the plurality of content messages and the predetermined time duration lapsing, deleting, by the first mobile device, the at least some of the plurality of content messages; and sending a report about presenting the first and second content messages to a wireless communication service provider computer system.

12. The method of content distribution of claim 11, wherein the report comprises at least one of an identification of the selected content message presented on at least one of the first or second mobile electronic devices, the time the selected content message was presented on the first or second mobile electronic devices, where the first or second mobile electronic devices were located when the selected content message was presented on the mobile electronic device, and an identification of a user profile characteristic associated with selecting the selected content message for presentation on the first or second mobile electronic device.

13. The method of content distribution of claim 11, wherein the first and second mobile electronic devices are one of a mobile phone, a personal digital assistant, a laptop computer, a tablet computer, a portable navigation system, and a personal digital television.

14. The method of content distribution of claim 11, further including:

a wireless communication service provider calculating a bill for presenting the selected content message on the first or second mobile electronic devices; and the wireless communication service provider sending the bill to an advertiser.

15. The method of content distribution of claim 11, wherein the content in each of the plurality of content messages comprises at least one of an advertisement and a public service announcement.

16. The method of content distribution of claim 11, wherein presenting the selected content message on the first or second mobile electronic devices comprises at least one of displaying video on a display screen of the first or second mobile electronic devices, displaying text on the display screen of the first or second mobile electronic devices, and playing audio on a speaker of the first or second mobile electronic devices.

17. The method of content distribution of claim 11, wherein the plurality of content messages is wirelessly broadcast uni-directionally in a high definition television channel.

18. The method of content distribution of claim 1, wherein the plurality of selection criteria is in a header portion of the at least one message.

* * * * *